(12) United States Patent
Zscheile, Jr. et al.

(10) Patent No.: US 6,201,786 B1
(45) Date of Patent: Mar. 13, 2001

(54) ADAPTABLE AND CONTROLLABLE MULTI-CHANNEL DATA LINK

(75) Inventors: John Walter Zscheile, Jr., Rockledge; Bruce John Weber, Melbourne, both of FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/107,208

(22) Filed: Jun. 29, 1998

(51) Int. Cl.[7] .......................... H04J 11/00; H04L 27/00; H04B 7/185
(52) U.S. Cl. .................. 370/206; 370/318; 455/13.4; 455/69
(58) Field of Search .................................. 370/316, 203, 370/206, 318, 465; 375/296, 297, 298; 455/12.1, 13.4, 69

(56) References Cited

U.S. PATENT DOCUMENTS

| | | | |
|---|---|---|---|
| 4,907,218 | * | 3/1990 | Inoue et al. .......................... 370/201 |
| 5,103,459 | * | 4/1992 | Gilhousen et al. .................. 370/209 |
| 5,313,279 | * | 5/1994 | Wang et al. .......................... 348/426 |
| 5,396,516 | * | 3/1995 | Padovani et al. ..................... 375/225 |
| 5,414,728 | * | 5/1995 | Zehavi ................................. 375/200 |
| 5,521,943 | * | 5/1996 | Dambacher .......................... 375/295 |
| 5,537,441 | * | 7/1996 | Bremer et al. ....................... 375/261 |
| 5,559,788 | | 9/1996 | Zscheile ............................... 370/206 |
| 5,790,533 | * | 8/1998 | Burke et al. ......................... 370/318 |
| 5,864,547 | * | 1/1999 | Strodtbeck et al. ................. 370/318 |
| 6,023,606 | * | 2/2000 | Monte et al. ........................ 455/13.1 |
| 6,070,074 | * | 5/2000 | Perahia et al. ....................... 455/430 |

\* cited by examiner

*Primary Examiner*—Min Jung
(74) *Attorney, Agent, or Firm*—Terry J. Anderson; Karl J. Hoch, Jr.

(57) ABSTRACT

In a data link system a master station is provided with transmitting apparatus capable of transmitting quadrature phase signal components representative of two diverse products either or both of which may comprise radar picture products. The dual input channels to the transmitter comprise an in-phase channel and a quadrature channel for receiving data representative of two diverse products. Independent controllers are provided in each of the dual channels capable of apportioning the power in the respective channels. A multi-mode processor is coupled to the controller in each of the dual channels so that independent control of data rates, power and picture product being transmitted is achieved.

10 Claims, 4 Drawing Sheets

ADAPTABLE AND CONTROLLABLE MULTI-CHANNEL DATA LINK

BACKGROUND OF THE INVENTION

1. Related Applications

The present invention relates to my co-pending U.S. application Ser. No. 09/107,209 filed Jun. 29, 1998 for A Method for Optimum Dissemination of Multi-Sensor Products.

2. Field of the Invention

The present invention relates to communication data links of the type employed between airborne platforms and ground stations. More particularly, the present invention relates to a novel rulti-channel data link where each channel is independently and adaptably controllable for data rate and power.

3. Description of the Prior Art

It is known that airborne surveillance platforms are used to capture optical images, infrared images and/or radar images and to process thre sensed information into a digital format for communication to a ground station or stations over a data link. Daal mode radar images have been captured and down loaded in real time over single channel data link.

In my U.S. Pat. No. 5,559,788 which is incorporated by reference herein, there is shown and described a multi-channel communications data link in which one input channel contains control information and the other quadrature input channel contains picture product information. In this patent, the two different types of information are combined and the combined data is transmitted over two different types of antennas. Then two different types of receivers are employed in ground stations in which only one of the receivers is capable of utilizing the picture product information.

It would be desirable to provide a dual channel data link capable of transmitting simultaneously two diverse picture products to all ground stations, however, only some of the ground stations can utilize both diverse picture products. It is further desirable to be able to control data throughput and transmission energy of the two diverse picture products in a manner which optimizes the use of available transmitter power and enhances picture quality at a plurality of the receivers.

SUMMARY OF THE INVENTION

It is a principal object of the present invention to optimize the reception of two diverse picture products at a plurality of ground station receivers.

It is a principal object of the present invention to transmit power representative of two diverse picture products over a multi-channel data link at controlled power levels.

It is a principal object of the present invention to determine at the transmitter the data integrity of the picture product being received at a ground station receiver to permit allocation of the percentage of total power between two diverse picture product signals transmitted to a plurality of ground station receivers.

It is a principal object of the present invention to provide a method and means for apportioning power between two diverse picture product channels that guarantees that at least one of the diverse picture products can be received by all ground station receivers.

It is a principal object of the present invention to provide a novel data link controller for proportioning power and setting data rates between two diverse picture product channels to guarantee that receivers in a maximum jamming hostile environment are supplied with a signal of sufficient signal to noise ratio strength so that the receiver can receive and display at least one of the desired diverse picture products without degradation.

It is a principal object of the present invention to control the power and data rate of transmission of one of said diverse picture product channels in a manner that all receiver users receive a useful picture product signal and any remaining power can be diverted to the other diverse picture product channel.

It is another principal object of the present invention to prioritize energy available at the transmitter to one of two diverse picture products channels and energy left over after supplying the higher priority picture product channel and to apportion the remaining power to the other picture product channel.

It is a general object of the present invention to be able to utilize and transmit the maximum amount of information available from a sensor in one of two diverse picture product channels and allocate all remaining energy to the remaining picture product channel.

It is another general object of the present invention to provide a continuously adaptive feedback loop signal which measures the data integrity of both diverse picture product channels and to continuously and adaptively control the data rate and power in the two diverse picture product channels independent of each other.

It is a general object of the present invention to provide a multi-channel data link apparatus and system for combining two orthogonal signals (in quadrature) and transmitting the two signals at the same frequency over a multi-mode data link communications channel.

According to these and other objects of the present invention, there is provided an apparatus and method for transmitting two picture products in the form of an in-phase and quadrature data component signal from an airborne platform which is received by ground station receivers capable of determining the inherent quality of the data component signals so that they are capable of transmitting back to the airborne platform signals indicative of the maximum data rate at which no picture quality errors or at which a standard of quality will occur at the present signal power level being received. The multi-mode data link processor continuously receives the signals from the plurally of ground station receivers and simultaneously adjusts the data rate and power level of the data component signals to obtain a predetermined optimum picture quality.

DETAILED DESCRIPTION OF THE PREFERRED EMBODIMENTS

Figure 1:
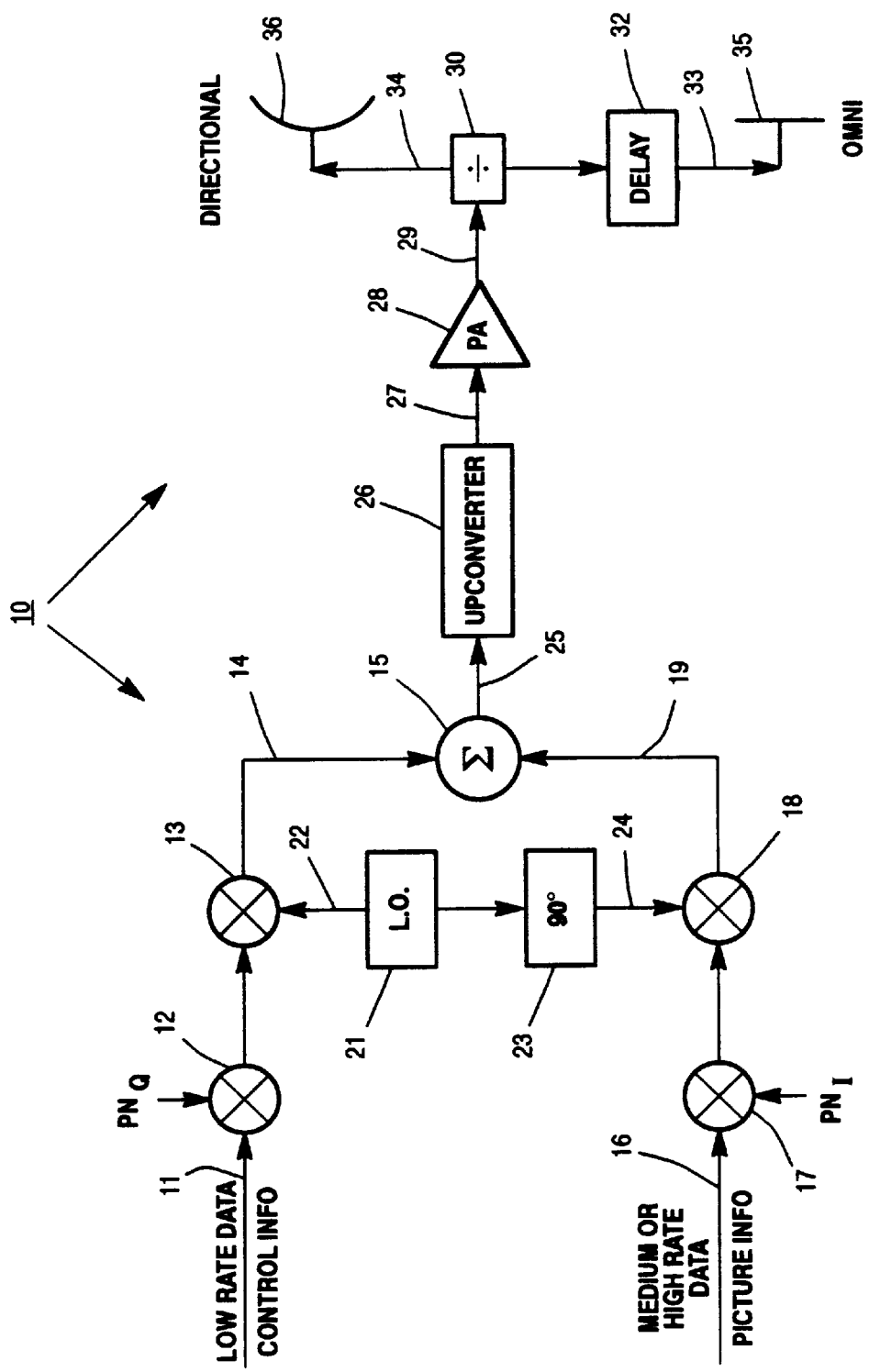
FIG. 1 is a schematic block diagram of a prior art transmitter having control information signals and picture information signals applied to quadrature and in-phase channels respectively of a modulator whose signals are then combined and transmitted from a pair of different type antennas for reception at different types of receivers.

Refer now to FIG. 1 showing a schematic block diagram of a prior art modulator/transmitter having a control information signal input line 11 coupled to an input of a mixer 12 having a second pseudo noise input signal $PN_Q$ applied thereto to produce an output which is applied to an input of a second mixer 13. The second mixer 13 is shown having an oscillator input for producing a modulated output on line 14 which is applied to a summing device or circuit 15. A second medium or high data rate channel 16 is shown having a picture information input which is applied to a mixer 17 also having a pseudo noise input $PN_I$ for producing an output which is applied to a second mixture 18. The second mixture 18 is shown having a quadrature input derived from a local oscillator 21 which produces the in-phase oscillator signal on line 24 and the quadrature output on line 22 after being processed through a 90° phase shifter 23. The mixer 18 is shown having an output on line 19 which is applied to the summing circuit 15 to produce a combined output on line 25 which is applied to an up converter 26. The output of the up converter produces a combined RF signal on line 27 which is applied to a transmitter power amplifier 28 having an output 29 which is divided at divider 30 to produce two signals. The signal on line 34 is applied to a directional antenna 36 having both the control information signal from line 11 and the picture information from line 16 transmitted therefrom.

The combined signal on line 29 is also applied to a delay circuit 32 to decorrelate the two signals being divided at divider 30 and produces a decorrelated signal on line 33 which is applied to an omni directional antenna 35. In my prior art FIG. 1, the picture information is only on the in-phase channel 16 which is applied to the summing circuit 15 at line 19. Further, the control information is only on the quadrature channel 11 and inputted to the summing circuit 15 at line 14. The combined information is transmitted by two distinctly different transmitting antennas to two distinctly different receiving antennas for two distinctly different purposes. For example, both signals are transmitted on the directional antenna 36 and are of sufficient strength to be received by a receiver having a receiver-type antenna within the main beam of the transmitted signal. In contrast thereto, both signals are being transmitted on omni directional antenna 35 and being received by similar receivers, however, the strength of the signal being received by their receivers are only of sufficient strength to successfully demodulate the control information applied on quadrature channel 11. Having explained the prior art modulitor/transmitter 10, it will be observed that the picture product information is only applied to the one channel. The picture product information on line 16 and control information on line 11 are limited to a fixed rate and to a fixed power. There are no means or provision for allocating portions of the total power of the transmitter to either of the quadrature channels.

Figure 2:
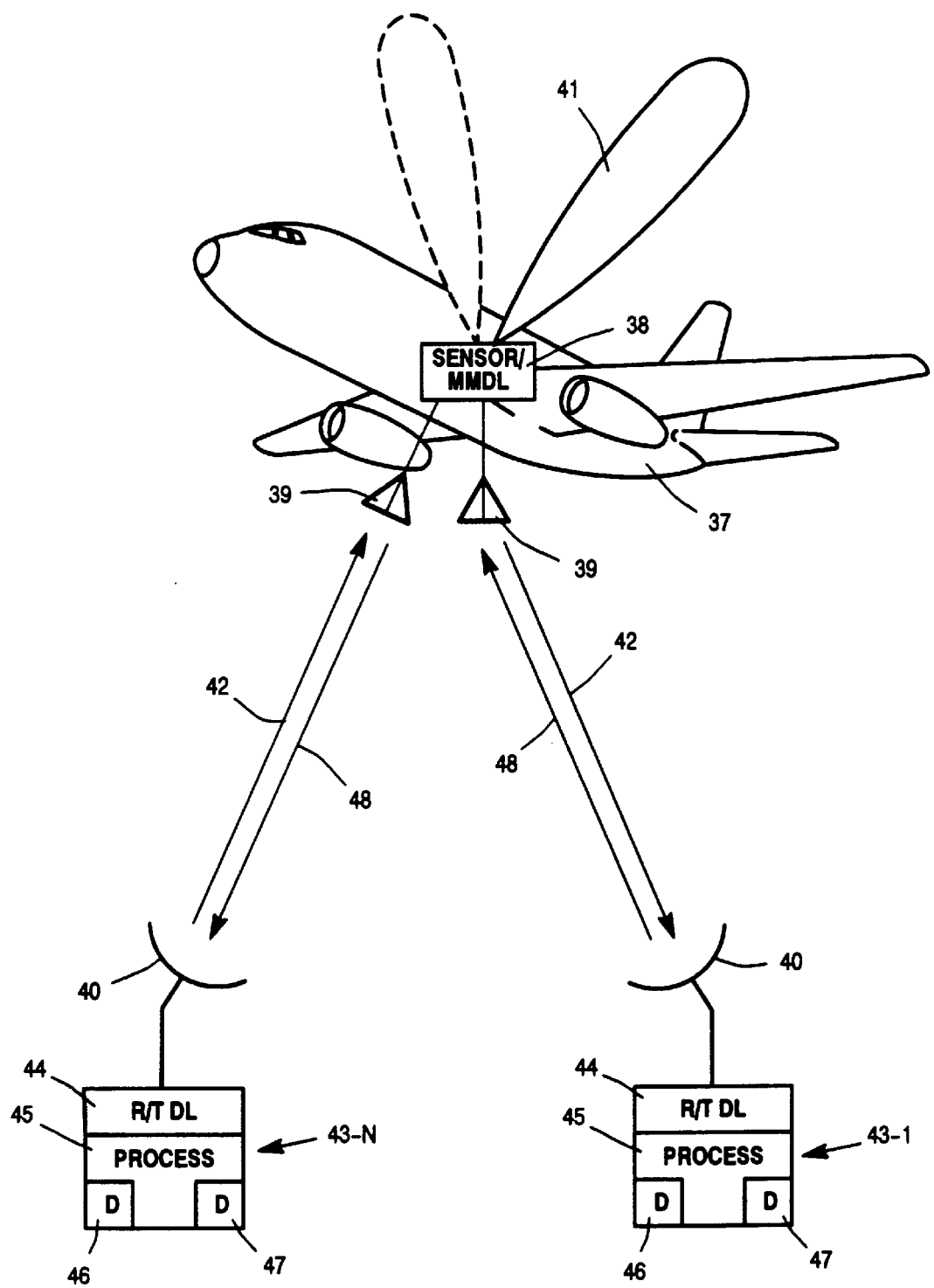
FIG. 2 is a schematic drawing illustrating the preferred embodiment in which the present invention is intended for use.

Refer now to FIG. 2 showing a schematic drawing illustrating the preferred embodiment in which the present invention is intended for use. In this drawing, the airborne platform 37 is an aircraft 37 having a sensor/multi-mode data link equipment device 38 which is coupled an omni directional antenna receiver 39. The sensor produces a beam 41 for sensing ground activity using a duel mode radar system. The antenna 39 produces a down link signal 42 which is received at the receiving/transmitting antennas 40 of the grounds stations 43-1 to 43-N. The ground stations are shown having receiver transmitter data links 44, processors 45 and displays 46 and 47 for displaying two distinctly different types of ground activity pictures. For example, one diverse picture would present anything in motion and the other diverse picture would present a snapshot or spot stationary picture of the ground surveillance area. After a ground station receives the down linked signal 42, it is processed in the processor 45 and a determination is made concerning the integrity of the received signal. The processor 45 generates an integrity signal and also determines the maximum rate which it can successfully demodulate the down link data signal. This information is now transmitted on up link 48 to the receiver antenna 39 for use in the sensor/MMDL 38 as will be explained in greater detail hereinafter. It will be understood that the airborne platform 37 may be a satellite or a helicopter or the equivalent can be produced by a fixed station at a high elevation which has line of sight to the receivers. Further, it is possible that some of the receivers can be airborne. Receiver ground stations 43-1 may be taken airborne and the same mode of operation and results will be achieved. There are numerous ways of information being sensed. There are three different ways to sense the information. The three most common are: electro-optical sensing, infrared sensing and radar sensing. The latter radar sensing is capable of producing two distinctly different products. One such product detects all motion and produces moving target reports to the receivers 43-1 to 43-N and the second produces a spot image or picture of all stationary objects within the beam of the scanner in the area of interest.

Figure 3:
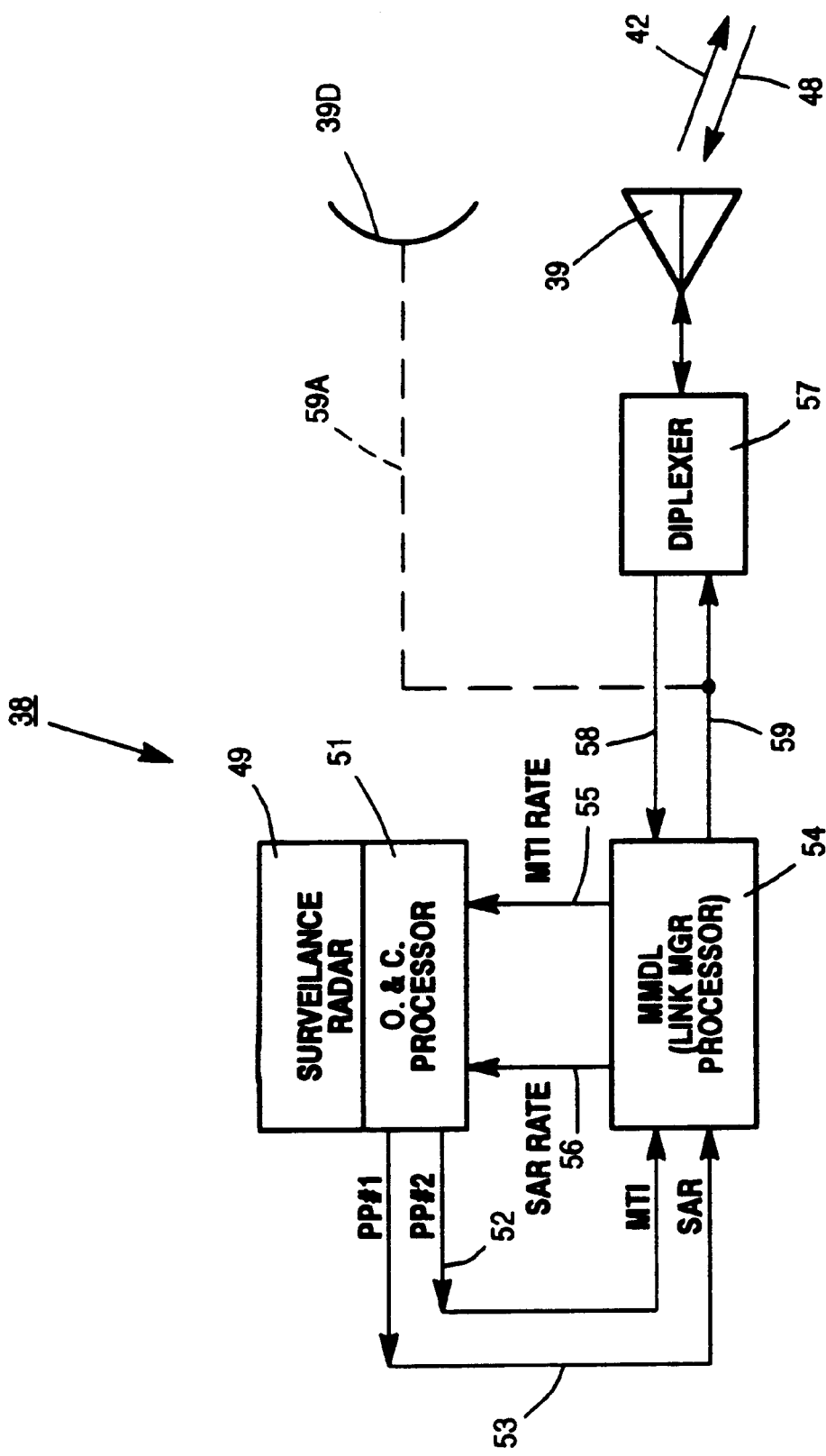
FIG. 3 is a schematic block diagram showing the preferred embodiment equipment which is used in the airborne platform.

Refer now to FIG. 3 showing a schematic block diagram of the preferred embodiment equipment which is used in the airborne platform 37. The equipment 38 in the airborne platform 37 is shown comprising a surveillance radar system 49 which is capable of producing two diverse picture product signals as will be explained in greater detail hereinafter. Coupled t:o and controlling the surveillance radar, there is shown an operational and control processor (O&C) 51 which produces the aforementioned picture product number 1 signal on line 53 and a picture product number 2 signal on line 52 which is coupled to the multi-mode data link manager processor 54. The multi-mode data link (MMDL) produces on line 55 a moving target indicator (MTI) data rate signal which is applied as an input to the processor 51 and a synthetic aperture radar (SAR) data rate control signal 56 which is applied to the processor 51. The link manager processor is coupled to antenna 39, shown coupled to the down link signal 42 and up link signal 48 as explained hereinbefore. The received signal is applied to a diplexer 57 which separates the desired received signal on line 58 that is applied to the link manager processor 54 and contains the data integrity information and the identification of the receiver which produced the information. The MMDL 54 processes this information to provide the MTI data rate command on line 56 and SAR data rate command on line 56. Having explained the equipment 38 with reference to antenna 39 which is capable of transmitting and receiving, it will be understood that a second directional antenna 39D could be coupled by a line 59A directly into the MMDL 54. This would provide a second transmission path similar to the system shown in the prior art FIG. 1.

Figure 4:
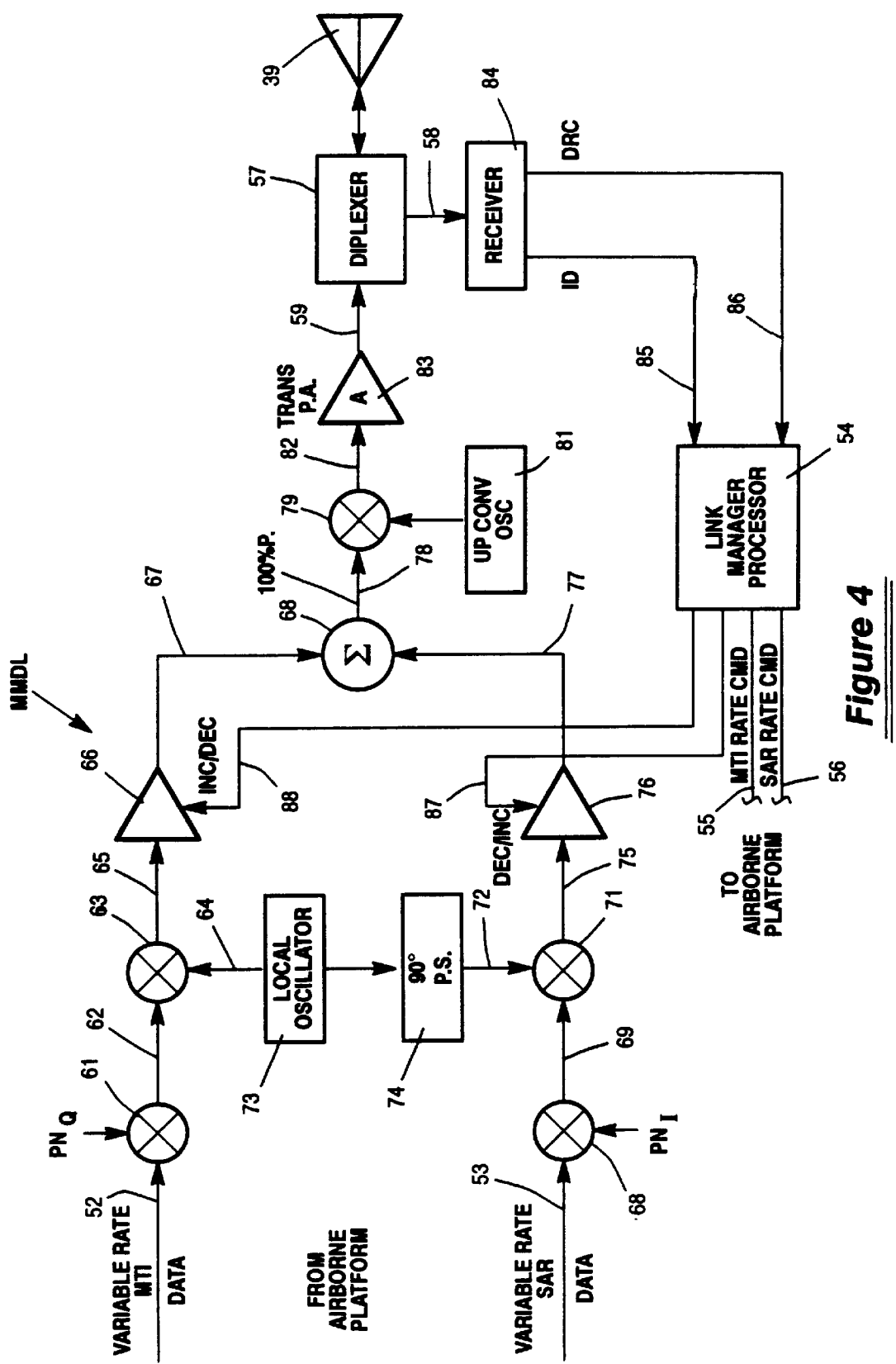
FIG. 4 is a more detailed schematic block diagram of the novel present invention multi-mode data link portion of the air borne equipment shown in FIG. 3.

Refer now to FIG. 4 showing a more detailed block diagram of the novel multi-mode data link (MMDL) portion of the airborne equipment shown in FIG. 3. The MMDL 54 comprises a modulator portion having an input channel shown having a variable rate MTI data at line 52. The signal on line 52 is applied to a mixer 61 along with a first pseudo noise signal shown as $PM_I$ to produce a spread signal on line 62 that is applied to a second mixer 63. The second mixer 63 has shown a local oscillator input on line 64 which produces from the mixer 63 the IF signal on line 65. The signal on line 65 is applied to an adjustable gain control amplifier 66 which produces the quadrature component of the IF signal on line 67 which is applied to a summing circuit 68.

There is shown a variable rate SAR data input on line 53 being applied to an in-phase channel 53 and to a mixer 68 shown having a pseudonoise in-phase PNI signal at a second input to produce a spread signal output on line 69 that is applied to a second mixer 71. The second mixer 71 is shown having a quadrature 90° phase shifted oscillator signal on line 72 produced by oscillator 73 and 90° phase shifter 74. The phase shifted IF signal on line 75 from mixer 71 is applied to the input of a second adjustable gain amplifier 76 which produces an output on line 77. The in-phase component of the IF signal is applied to the summing circuit 68. The output from summing circuit 68 represents the 100% total power of the IF signal from the combined channels which is applied to a mixer 79 which has a second input from an up converting oscillator 81. The output from the mixer 79 on line 82 represents the radio frequency signal which is applied to a power amplifier 83. The power amplifier 83 produces the combined transmit signal of the two channels which passes through the diplexer 57 to the omni directional antenna 39 described hereinbefore. The omni directional antenna 39 has also been described as a receiving/transmitting antenna and signals being received therein pass through diplexer 57 onto line 58 to a receiver 84 inside of the MMDL 84. Th(e receiver 84 is shown producing a ID signal on line 85 which corresponds to the identify of the ground station for the data received on line 86 from the same ground station whose identity is shown on line 85. Both lines 85 and 85 are coupled to the input side of link manager processor 54 which in turn produces the aforementioned signals on line 55 and 56 as shown in FIG. 3 and are here labeled the MTI data rate command and the SAR data rate command, respectively. Further, the link manager 54 produces control signals on lines 87 and 88 which are applied to the adjustable gain amplifier 66 and 76 to control the amount of power on lines 67 and 77, respectively. Other types of power controllers 66, 76 may be employed.

In the preferred embodiment of the present invention explained hereinbefore, the airborne platform 37 was shown having a dual mode radar sensor for producing two diverse and distinct picture products that are combined and transmitted from the same transmitter and the same antenna to a plurality of receivers 43. The receivers in turn have informed the link manager processor 54 the results of having received the image integrity signals resulting from the transmission signals 42 described hereinbefore. The identify and sustainable data rate information on lines 85 and 86 now permits the link manager processor to control the amplitude and data rate of the signals in the two channels shown starting at lines 52 and 53 respectively. The control of each channel is independent of the other as to both data rate and power.

As an example of the advantage of the present MMDL system, a receiver 43 may be Located in a very hostile jamming environment condition and the MMDL system is capable of diverting and adapting sufficient power and data rate to the down link signal 42 to enable this receiver in its hostile environment to receive a completely usable picture product signal. The cost side of achieving this novel result is that the quadrature channel is robbed of part of its energy and therefore must reduce its data rate but still is capable of receiving a quality picture product image.

As a second example, when the receivers 43 are in a benign environment where no jamming or interference signals are present, then both channels can produce an optimum strength signal at a maximum data rate.

Having explained a preferred embodiment of the present invention, it will be appreciated that picture product data could be replaced with other forms of data without modification of the apparatus. The multi-mode data link processor is capable of controlling the power in each of the dual channels independently to achieve a predetermined desired result at the receiving stations.

The power controllers illustrated are capable of apportioning power in their respective channels. Other types of known controllers and/or attenuators could be employed within the spirit and scope of the present invention.

What is claimed is:

1. Apparatus for transmitting quadrature phase signal components representative of two diverse picture products, comprising:

an in-phase channel (I) for receiving data representative of a first picture product to be transmitted, a quadrature channel (Q) for receiving data representative of a second picture product to be transmitted, summing means for producing a power signal, first control means coupled in said in-phase channel and having a first picture product output signal coupled to said summing means, second control means coupled in said quadrature channel and having a second picture product output signal coupled to said summing means, power transmitter means coupled to the output of said summing means, antenna means for transmitting said first and second picture product signals as a complex quadrature radio frequency signal, and multi-mode data link (MMDL) processor means coupled to said first and second control means for independently controlling said quadrature phase signal components.

2. Apparatus as set forth in claim 1 wherein said MMDL processor means are adapted to control the amplitude of the total power signal from said summing means by apportioning power amplitude signals from said first and second control means.

3. Apparatus as set forth in claim 2 wherein said MMDL processor means increases power in said in-phase channel while simultaneously decreasing power in said quadrature channel and vice versa while maintaining said total power from said summing means.

4. Apparatus as set forth in claim 1 wherein said MMDL processor means is located in an airborne platform and comprises:

means for receiving picture product quality indicator signals from a plurality of ground stations, and means for producing output signals coupled to said first and said second control means for maintaining a predetermined quality of picture products in said ground stations.

5. Apparatus as set forth in claim 4 wherein said MMDL processor means further includes means for maintaining a higher quality picture product of one of said two diverse picture products while virtually ignoring the other of said picture products.

6. Apparatus as set forth in claim 5 wherein said MMDL processor means further includes means for increasing and decreasing the data rate of data representative of either of said two diverse picture products.

7. Apparatus as set forth in claim 1 wherein said MMDL processor means is in an airborne platform and comprises:

means for apportioning the power in each of said quadrature channels coupled to said first and second control means, means for receiving quality indicator signals from said ground stations, and means for independently adjusting the data rate of the phase signal components in said quadrature channels.

8. Apparatus as set forth in claim 7 wherein said MMDL processor means further includes means for simultaneously apportioning power and adjusting the data rates in said quadrature channels in response to said quality indicator signals to maintain a predetermined picture quality in one or more of said ground stations.

9. Apparatus as set forth in claim 8 wherein said quality indicator signals from said ground stations includes the effect of jamming signals and said means for simultaneously apportioning power and adjusting data rates automatically compensates for all intermittent signals and conditions.

10. Apparatus as set forth in claim 8 wherein said MMDL processor means further includes predetermined program means for defining desired priorities and conditions, and said means for simultaneously apportioning power and adjusting data rates automatically optimizes said picture quality corresponding to the predetermined program means.

* * * * *